United States Patent [19]

Cholvin et al.

[11] Patent Number: 4,513,730
[45] Date of Patent: Apr. 30, 1985

[54] SUPERCHARGED DIESEL ENGINE AIR INFLOW CONTROL SYSTEM

[75] Inventors: Robert L. Cholvin, Santa Monica; Charles E. McInerney, Rolling Hills Estates; James N. Nancarrow, Torrance; Jack L. Gantz, Marina Del Rey, all of Calif.

[73] Assignee: The Garrett Corporation, Los Angeles, Calif.

[21] Appl. No.: 598,144

[22] Filed: Apr. 9, 1984

Related U.S. Application Data

[62] Division of Ser. No. 424,205, Sep. 27, 1982, Pat. No. 4,489,702.

[51] Int. Cl.³ .............................................. F02D 23/02
[52] U.S. Cl. ............................................................. 123/564
[58] Field of Search ................... 60/600, 601, 602, 603, 60/611; 123/564

[56] References Cited

U.S. PATENT DOCUMENTS

| | | | |
|---|---|---|---|
| 1,346,124 | 7/1920 | Guerrlich | 123/564 |
| 3,107,483 | 10/1963 | Hamilton | 60/605 |
| 3,233,403 | 2/1966 | MacInnes et al. | 60/600 |
| 3,324,651 | 6/1967 | Smith et al. | 60/611 X |
| 3,421,314 | 1/1969 | Michalke | 60/611 |
| 4,350,135 | 9/1982 | Casey et al. | 123/564 |

FOREIGN PATENT DOCUMENTS

| | | | |
|---|---|---|---|
| 657993 | 3/1938 | Fed. Rep. of Germany | 123/564 |
| 148920 | 11/1979 | Japan | 60/602 |
| 8329 | 1/1982 | Japan | 60/602 |
| 35436 | 12/1934 | Netherlands | 123/564 |

Primary Examiner—Michael Koczo
Attorney, Agent, or Firm—J. Henry Muetterties; Stuart O. Lowry; Albert J. Miller

[57] ABSTRACT

A control system is provided for a supercharged diesel engine to control engine air flow in response to an operator-selected fuel flow and in accordance with a predetermined air-fuel ratio schedule chosen for minimizing undesirable exhaust emissions throughout a broad range of engine operating conditions. The control system includes a force-biased relief valve movable between closed and open positions in response to the pressure of air supplied to the engine, wherein the force-bias acting upon the relief valve is altered in response to the operator-selected fuel flow to the engine.

2 Claims, 4 Drawing Figures

SUPERCHARGED DIESEL ENGINE AIR INFLOW CONTROL SYSTEM

This is a division of application Ser. No. 424,205 filed Sept. 27, 1982, U.S. Pat. No. 4,489,702.

BACKGROUND OF THE INVENTION

This invention relates generally to systems and devices for controlling the ratio of air and fuel supplied to an internal combustion engine. More specifically, this invention relates to an air inflow control system particularly for use with diesel engines to schedule the air-fuel ratio in accordance with fuel flow to minimize exhaust pollutants.

In a diesel engine system, the engine is controlled by selecting the flow of fuel supplied to the engine in accordance with desired or required engine operating conditions, such as speed and/or load, wherein this fuel is mixed with air for combustion within engine cylinders to provide a usable power output. The air inflow to the engine, however, typically is substantially unregulated relative to the fuel flow but instead constitutes a relatively high air flow chosen to provide a desired air-fuel ratio at relatively high speed and/or high load engine operation. As a result, the ratio of air and fuel supplied to the engine may vary widely over a range of engine operating conditions, with excess air being supplied to the engine especially during relatively low speed or part-load operation. The amount of this excess air can be particularly significant when the engine system includes a supercharging device, such as an engine-driven air pump or an exhaust gas driven turbocharger to provide a relatively high mass flow of air to the engine.

In a diesel engine, it is known that fluctuations in the ratio of air and fuel supplied to the engine have a direct and adverse impact upon the level of toxic compounds in the engine exhaust gases. More particularly, substantial air inflow exceeding the amount necessary for complete and relatively smoke-free fuel combustion can alter combustion temperatures resulting in a substantial and undesirable increase in the generation of toxic oxides of nitrogen as combustion by-products. However, a constant air-fuel ratio for all engine operating conditions does not necessarily result in minimizing toxic emissions, whereby some relatively minor adjustment in the air-fuel ratio may be desirable.

A variety of control systems and devices have been proposed to control noxious emissions from internal combustion engines by regulating engine air inflow. For example, exhaust gas recirculation systems are well known wherein a recirculation valve responsive to engine operating conditions diverts a metered portion of substantially inert engine exhaust gases to the engine air intake thereby reducing and regulating the mass flow of air supplied to the engine. However, exhaust gas recirculation systems are accompanied by a number of disadvantages, such as contamination of the recirculation valve and/or the engine with carbon, moisture, and other contaminants present in the exhaust gases.

A variety of other control systems have been proposed for restricting or otherwise regulating the flow of air to an engine, thereby achieving at least some degree of control over engine air-fuel ratio. However, such systems have been responsive to a variety of parameters, such as barometric pressure, exhaust gas temperature, exhaust gas oxygen level and the like, wherein these parameters are not directly indicative of engine fuel flow and thus do not permit accurate control of the air-fuel ratio in a diesel engine as the fuel flow is varied throughout a range of engine operating conditions. Moreover, these systems normally control air flow by use of a throttle valve which results in an undesirable parasitic load on a supercharging device. Alternately, such systems have been designed to control air flow over a narrow range of engine operating conditions or have not accommodated accurate scheduling of the air-fuel ratio, whereby optimization of air-fuel ratio for minimum toxic emissions has not been achieved.

There exists, therefore, a significant need for an improved air inflow control system responsive directly to an operator-selected fuel flow and thus applicable for use with diesel engines to accurately control the ratio of air and fuel throughout a broad range of engine operating conditions. Moreover, there exists a need for such a control system including the capability to schedule the engine air-fuel ratio for minimum toxic exhaust emissions. The present invention fulfills this need and provides further related advantages.

SUMMARY OF THE INVENTION

In accordance with the invention, an air inflow control system is provided particularly for use in a supercharged diesel engine for controlling the ratio of air and fuel supplied to the engine directly in response to an operator-selected fuel flow and in accordance with a prescribed schedule for minimum toxic exhaust emissions. The control system includes a controller responsive to engine air inflow and the position of a fuel flow control device for controlling the position of a relief valve to relieve a portion of the air flow from the engine without throttling. The relieved air flow can be discharged to atmosphere, or alternatively bypassed to the upstream side of a supercharging device for recirculation.

In a preferred form of the invention, the controller comprises a movable piston or diaphragm exposed to engine intake manifold pressure and biased by a spring having selected spring force characteristics toward a position normally closing the relief valve to permit the entire air flow to flow into the engine. The spring force is supplemented by a secondary biasing force which can be provided pneumatically or by a second spring and is variable in response to the operator-selected position of the fuel flow control device. The piston or diaphragm is thus biased in accordance with fuel flow to the engine for modulation in response to engine intake manifold pressure which is indicative of air inflow to controllably open the relief valve for selectively relieving a portion a the air flow. The characteristics of the biasing forces on the piston or diaphragm are chosen such that the air flow is relieved in accordance with a scheduled air-fuel ratio selected for minimum toxic exhaust emissions.

The air flow control system is applicable particularly for use with two- or four-cycle supercharged diesel engines to relieve a portion of the air flow either to atmosphere or alternatively to recycle the relieved air flow portion to the intake side of a supercharging device. In a two-cycle diesel engine system of the type including a turbocharger and a scavenge blower, the controller advantageously bypasses the relieved air flow portion from the discharge side to the intake side of the scavenge blower thereby at least partially unloading the scavenge blower to reduce the power requirements thereof.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
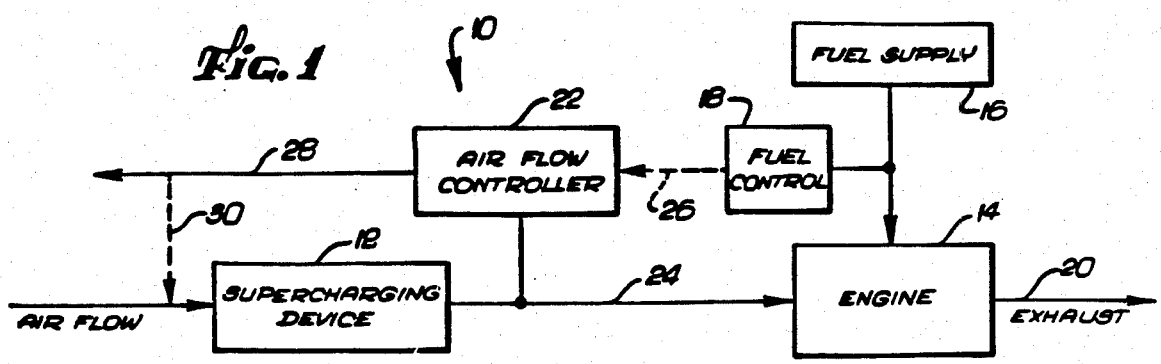
FIG. 1 is a schematic diagram illustrating a supercharged engine system including an air flow control system embodying the novel features of the invention.

As illustrated generally in FIG. 1, an air flow control system referred to generally by the reference numeral 10 is provided for controlling air flow from a supercharging device 12, such as a mechanically driven air pump or exhaust gas-driven turbocharger or the like, to an internal combustion engine 14. This engine 14 comprises in a preferred form a conventional four-stroke or two-stroke diesel engine to which fuel is supplied from a fuel supply 16 in accordance with an operator-selected setting of a fuel flow control device 18, such as the foot pedal in a bus, truck, or the like. The fuel admixes within the engine with the air supplied from the supercharging device 12 for combustion, whereupon the products of combustion are exhausted through an exhaust conduit 20.

In a diesel engine, the engine power output is selected by appropriate positioning of the fuel flow control device 18, with air flow being substantially unregulated relative to the fuel flow whereby the air-fuel ratio typically varies considerably throughout a range of engine operating conditions, particularly when the air flow is supplied by the supercharging device 12. As a result, substantial excess air is normally available primarily at low speed or part-load engine operating conditions, wherein this excess air contributes to the formation of toxic oxides of nitrogen in the exhaust gases.

The air flow control system 10 of this invention provides a relatively simple yet highly effective system for closely controlling the ratio of air and fuel supplied to the engine 14 to prevent exhaust emissions. The system 10 functions by relieving a regulated portion of the air inflow directly in response to the particular setting of the fuel flow control device 18 to control the air-fuel ratio throughout a broad range of engine operating conditions. Importantly, the air inflow may be advantageously modulated in response to fuel flow to provide controlled adjustment of the air fuel ratio in accordance with a predetermined schedule chosen for minimum noxious exhaust emissions. Moreover, the air inflow is partially relieved without throttling thereof to avoid unnecessary loading on the supercharging device thereby decreasing parasitic engine power losses.

As shown in schematic form in FIG. 1, the air flow control system 10 includes a controller 22 coupled to an air inflow conduit 24 connected between the discharge side of the supercharging device 12 and the intake side or intake manifold of the engine 14. The controller 22 modulates the position of a relief valve (not shown in FIG. 1) in response to the operator-selected setting of the fuel flow control device 18, as indicated by the dashed line 26 in FIG. 1, and further in response to the pressure of air at the intake side of the engine wherein this pressure is indicative of air inflow. In response to these parameters, the controller 22 adjusts the position of the relief valve to relieve a portion of the air flow from the conduit 24 to atmosphere through a relief conduit 28, or alternatively, to the upstream side of the supercharging device 12 through a recycle conduit indicated in FIG. 1 by the dashed line 30.

Figure 2:
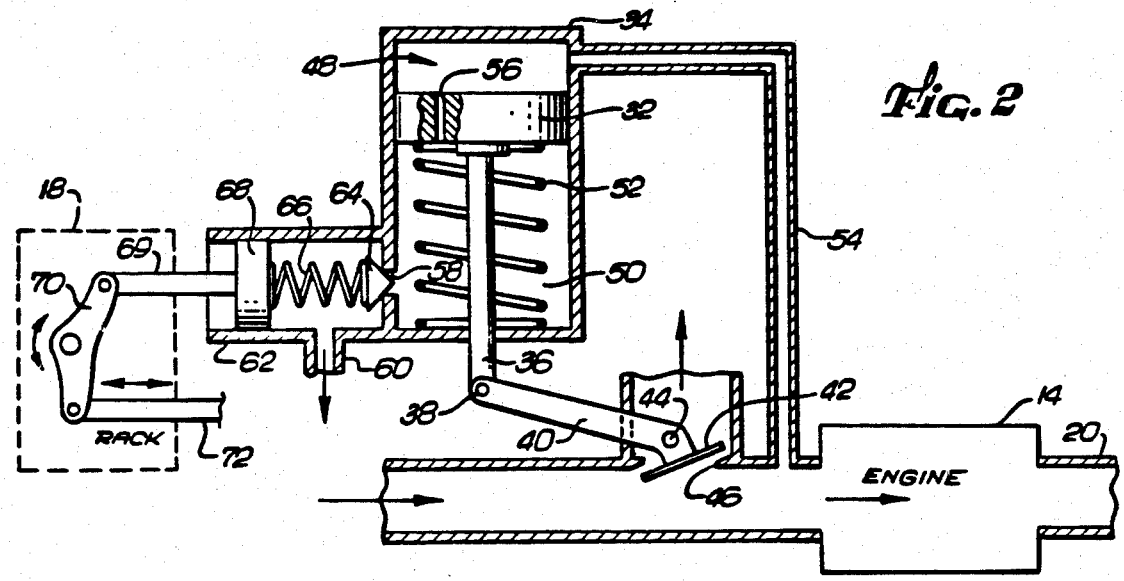
FIG. 2 is a generally schematic diagram illustrating one form of a controller for use in the air flow control system of this invention.

In one exemplary form, as illustrated schematically in FIG. 2, the controller 22 comprises a piston 32 carried within a cylindrical controller housing 34 for movement in response to engine air intake pressure and further in response to the position of the fuel flow control device 18. The piston 32 is joined to an actuator rod 36 which projects out of the housing 34 and is connected via a pivot pin 38 to one end of a crank link 40 having its opposite end in turn secured to the relief valve 42 disposed for pivoting movement about the axis of a mounting pin 44 to open and close a relief port 46 in the air inflow conduit 24. Accordingly, movement of the piston 32 directly controls and modulates the position of the relief valve 42 to regulate the portion of the air flow relieved through the relief port 46 to the relief conduit 28.

The piston 32 is disposed generally in a central position within the controller housing 34 to separate an upper pressure chamber 48 from a lower pressure chamber 50. A compression spring 52 positioned within the lower pressure chamber 50 reacts between the housing 34 and the piston 32 to urge the piston upwardly, as viewed in FIG. 2, with a predetermined spring force. This spring force thus biases the piston toward a normal position moving the actuator rod 36 and the relief valve 42 to close the relief port 46 such that the entire air flow from the supercharging device 12 is supplied to the engine 14.

Actual air inflow to the engine 14 is sensed by the piston 32 by means of a pressure conduit 54 coupling the controller pressure chamber 48 to the intake side of the engine at a location downstream of the relief valve 42. More particularly, the air pressure at the intake side of the engine is coupled to the upper pressure chamber 48 to act against one side of the piston 32 and to oppose the biasing force of the compression spring 52. As illustrated, this pressure is further communicated through an orifice 56 in the piston 32 to the lower pressure chamber 50, wherein the orifice assures a pressure differential across the piston, and further to atmosphere through a control port 58 leading from the lower pressure chamber 50 and a discharge port 60 formed in an auxiliary housing 62 to be described in more detail. Accordingly, when the pressure at the intake side of the engine exceeds a predetermined threshold, as selected by the force characteristics of the compression spring 52, the piston 32 moves downwardly within the controller housing 34 to move the relief valve 42 to an open position. This relieves a portion of the air flow from the conduit 24 to correspondingly reduce the pressure at the intake side of the engine such that the controller modulates the relief valve to maintain the desired air intake pressure. This pressure relief advantageously occurs without throttling by orienting the relief valve 42 for movement of its upstream edge into the air flow within the conduit 24, whereby a portion of the air flow is diverted smoothly through the relief port 46 into the relief conduit 28.

According to a primary aspect of the invention, the pressure within the lower controller pressure chamber 50 is selectively adjusted in accordance with the position of the fuel flow control device 18 to provide a pressure force supplementing the biasing force of the compression spring 52. In this manner, the total force on the piston 32 acting against the engine air intake pressure is modified in direct response to the operator-selected fuel flow control such that piston movement is responsive directly to said fuel flow.

More particularly, discharge flow of air from the pressure chamber 50 through the control port 58 is regulated by a regulator valve 64 carried within the auxiliary housing 62 and biased by a second compression spring 66 toward a position normally closing the control port 58. The force by which this second spring 66 urges the regulator valve 64 toward the closed position is varied in accordance with the position of an adjustable slide block 68 within the auxiliary housing 62. This slide block 68 is linked directly to the fuel flow control device 18, such as by a control link 69 connected to a cam member 70 which is in turn coupled to a conventional fuel flow control rack 72, whereby the spring force applied to the regulator valve 64 is directly related to the fuel flow to the engine.

During relatively low speed and/or part-load operation of the engine, when fuel flow to the engine is relatively low, the fuel control rack 72 is positioned by the operator to draw the slide block 68 relatively away from the control port 58 thereby reducing the magnitude of the spring force acting on the regulator valve 64. Accordingly, pressure within the lower pressure chamber 50, which builds up as a result of air flow through the piston orifice 56, acts against the regulator valve 64 to open the control port 58 sufficiently to maintain the pressure in the pressure chamber 50 at a relatively low level. This permits a relatively low engine intake manifold pressure to move the piston 32 downwardly against the compression spring 52 and pressure within the chamber 50 for opening the relief valve 42.

When fuel flow is increased, such as for higher speed and/or higher load engine operation, the fuel control rack 72 is moved by the operator in a direction displacing the slide block 68 generally toward the control port 58, as viewed in FIG. 2, to increase the spring force urging the regulator valve 64 to a position closing the control port 58. This results in a relatively higher pressure within the lower pressure chamber 50 of the controller housing 34 thereby increasing the total force supplementing the compression spring 52. As a result, the piston 32 is subjected to an increased total biasing force resisting movement in response to the engine intake manifold pressure thereby resetting the relief valve 42 for comparatively higher air flow to the engine. The ratio of air and fuel supplied to the engine is thus continuously controlled throughout engine operation in response to the operator-selected setting of the fuel control rack 72.

The control system 10 advantageously permits adjustment of the engine air fuel ratio in accordance with a selected schedule chosen for minimizing toxic exhaust emissions. Such scheduling is achieved by designing the compression springs 52 and 66 to have desired sets of spring force characteristics which may vary linearly or nonlinearly when compressed to obtain a selected engine air inflow for a corresponding fuel flow.

Figure 3:
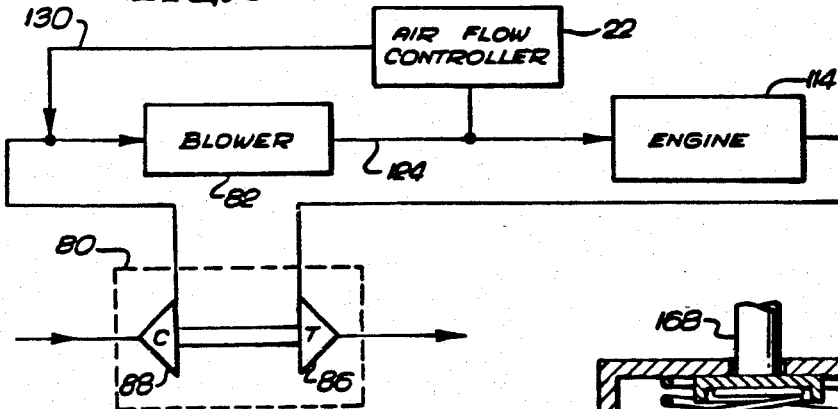
FIG. 3 is a schematic diagram illustrating the controller in an alternative engine system.

In one alternative schematic system, as viewed in FIG. 3, the controller 22 of FIG. 2 is advantageously incorporated into an engine system having an engine 114 supplied with air by an exhaust gas driven turbocharger 80 and an auxiliary blower 82. The engine 114 may comprise a four-cycle engine wherein the auxiliary blower 82 is provided to supplement air supply during selected engine operating conditions, or alternatively, the engine may comprise a two-cycle engine wherein the auxiliary blower 82 is a conventional mechanically driven scavenge blower required for engine starting and/or rapid acceleration modes. At other times, however, particularly in a two-cycle diesel engine, the output of the blower 82 normally is not required and thus constitutes excess air.

The controller 22 functions in the system of FIG. 3 to relieve a portion of the air flow from an air inflow conduit 124 coupled between the discharge side of the blower 82 and the intake side of the engine 114 and to recycle the relieved portion of the air flow directly to the intake side of the blower 82 via a recycle conduit 130. With this arrangement, the pressure differential across the blower 82 can be reduced substantially thereby substantially unloading the blower 82 and correspondingly eliminating the associated parasitic power loss on the engine during system operation. Toxic engine emissions are thus substantially reduced while not affecting normal operation of the turbocharger 80 which includes a turbine 86 driven by engine exhaust gases to drive a compressor 88 to supply pressurized intake air to the engine.

Figure 4:
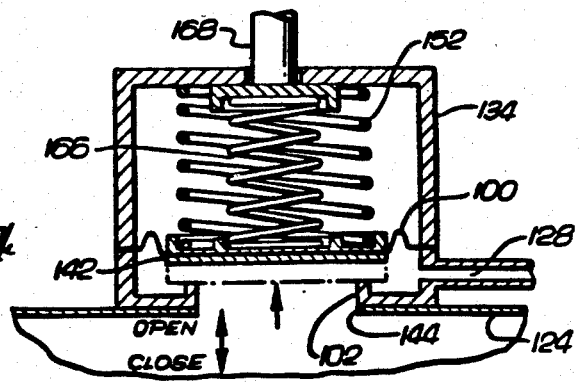
FIG. 4 is an enlarged generally schematic representation of an alternative form of the controller.

One simplified alternative form of the controller 22 is illustrated in FIG. 4, wherein a relief valve 142 corresponding functionally with the relief valve 42 of FIG. 2 is mounted within a modified controller housing 134. This relief valve 142 comprises a valve disk supported directly by a resilient diaphragm 100 to open and close a relief port 102 in the housing 134 which is aligned with a relief port 144 in an air flow conduit 124. A compression spring 152 reacts between a portion of the controller housing 134 and the relief valve 142 to urge the valve downwardly toward a normal seated position closing the relief port 102, as shown in dotted lines in FIG. 4. Accordingly, the relief valve is exposed directly to the pressure of air supplied to the engine and thus will move in response to this pressure to open the relief port 102 thereby permitting relief of air flow to a relief conduit 128 whenever the pressure exceeds a predetermined threshold.

A second spring 166 is provided to supplement the total biasing force acting on the relief valve in direct response to fuel flow to the engine. This second spring 166 reacts between the relief valve and a slide block 168 which is adjusted in position in direct response to fuel flow in the same manner as described with respect to FIG. 2. Accordingly, when fuel flow to the engine is increased, the slide block 168 is moved downwardly, as viewed in FIG. 4, to increase the spring force applied to the relief valve 142 thereby tending to resist opening of the relief port 102 and increasing the air flow supplied to the engine. In this manner, air flow is continuously adjusted in accordance with the operator-selected fuel flow to provide a controlled air-fuel ratio which can be selected in accordance with a predetermined schedule as dictated by the particular force characteristics of the springs 152 and 166 for minimum exhaust emissions throughout a range of engine operating conditions.

A variety of modifications and improvements to the invention described herein are believed to be apparent to one of ordinary skill in the art. Accordingly, no limitation on the invention is intended, except by way of the appended claims.

What is claimed is:

1. An air inflow control system for a diesel engine system including a supercharging device for supplying air under pressure to an engine, an air inflow conduit coupled between the discharge side of the supercharging device and the intake side of the engine, and a fuel control rack for selectively controlling the flow of fuel to the engine, comprising:

a relief valve movable to open and close a relief port formed in the air inflow conduit to selectively divert a portion of the air flow from the engine; and a controller including means for movably supporting said relief valve for movement relative to said relief port in response to the pressure of air within the air inflow conduit wherein said air pressure is indicative of engine air inflow, a first spring for biasing said relief valve with a predetermined force toward a position closing said relief port, a slide block coupled to the fuel control rack for movement in response thereto, and a second spring reacting between said slide block and said relief valve to adjustably bias said relief valve toward a position closing said relief port.

2. An air inflow control system for a diesel engine system including a supercharging device for supplying air under pressure to an engine, an air inflow conduit coupled between the discharge side of the supercharging device and the intake side of the engine, and a fuel control rack for selectively controlling the flow of fuel to the engine, comprising:

a relief valve movable to open and close a relief port formed in the air inflow conduit to selectively divert a portion of the air flow from the engine; and a controller including a housing having an outlet opening formed therein, diaphragm means cooperating with said housing for movably supporting said relief valve within said housing and for movement between a closed position closing said relief port and an open position opening said relief port for communication with the outlet opening in response to the pressure of air within said air inflow conduit wherein said air pressure is indicative of engine air inflow, said outlet opening and said relief port being disposed on the same side of said diaphragm means, said controller further including a first compression spring reacting between said housing and one side of said relief valve opposite said relief port for biasing said relief valve with a predetermined force toward said closed position, a slide member coupled to the fuel control rack for movement in response thereto, and a second compression spring reacting between said slide member and said one side of said relief valve to adjustably bias said relief valve toward said closed position.

* * * * *